United States Patent [19]  
Tomioka et al.

[11] Patent Number: 4,939,190  
[45] Date of Patent: Jul. 3, 1990

[54] AQUEOUS EMULSION-TYPE PRESSURE SENSITIVE ADHESIVES

[75] Inventors: Reizaburo Tomioka, Chiba; Yasuhiro Shigematsu, Ichihara, both of Japan

[73] Assignee: Dainippon Ink And Chemicals, Inc., Tokyo, Japan

[21] Appl. No.: 197,963

[22] Filed: May 24, 1988

[30] Foreign Application Priority Data

May 25, 1987 [JP] Japan .................................. 62-125843
Jun. 20, 1987 [JP] Japan .................................. 62-152411

[51] Int. Cl.$^5$ .............................................. C08K 9/00
[52] U.S. Cl. ...................................... 523/206; 523/201; 525/902; 525/936; 526/931; 526/937; 524/458; 524/460
[58] Field of Search .............. 523/206, 201; 525/902, 525/936; 526/931, 937; 524/458, 460

[56] References Cited

U.S. PATENT DOCUMENTS 4,717,750 1/1988 Makati et al. ..................... 523/201

FOREIGN PATENT DOCUMENTS 58-185668 10/1983 Japan .
1257940 12/1971 United Kingdom .

Primary Examiner—Joseph L. Schofer
Assistant Examiner—Peter D. Mulcahy
Attorney, Agent, or Firm—Sherman and Shalloway

[57] ABSTRACT

An aqueous emulsion-type pressure sensitive adhesive characterized in that the aqueous emulsion is prepared by (i) a first step of emulsion polymerizing an ethylenically unsaturated monomer composed essentially of at least one type of styrene, alpha-methylstyrene, acrylonitrile, methyl methacrylate and vinyltoluene in the presence of an emulsion composed of at least one tackifier resin selected from a rosin ester, a petroleum resin and a terpene resin to form an aqueous emulsion containing particles of a two-layered structure having a core layer of the tackifier resin and a layer of a polymer (polymer $A_1$) derived from the ethylenically unsaturated monomer, and (ii) a second step of using the aqueous emulsion containing the particles of the two-layered structure as a seed and emulsion polymerizing an ethylenically unsaturated monomer composed essentially of at least one alkyl (meth)acrylate (an alkyl group has 4 or more carbon atoms) to form an aqueous emulsion containing particles of a multilayered structure having also a layer of a polymer (polymer $A_2$) derived from the ethylenically unsaturated monomer.

19 Claims, No Drawings

AQUEOUS EMULSION-TYPE PRESSURE SENSITIVE ADHESIVES

This invention relates to an aqueous emulsion-type pressure sensitive adhesive. More specifically, this invention relates to an aqueous emulsion-type pressure sensitive adhesive which exhibits good adhesion to polyolefins in particular and gives excellent film transparency.

Rubber or acrylic pressure sensitive adhesives have been hitherto widely known and found wide acceptance in adhesive tapes, adhesive sheets and the like.

Of these, the rubber pressure sensitive adhesives can conveniently be bonded to a relatively large number of materials, but are poor in weatherability and heat resistance.

Meanwhile, the acrylic pressure sensitive adhesives have increasingly been used in many usages by making the most of their excellent weatherability and heat resistance However, they are poor in adhesion to polyolefins. To compensate this defect, an attempt has been made to add so-called tackifier resins such as rosin esters, terpene resins, alkylphenol resins, petroleum resins, etc.

In a technology of improving adhesion by the addition of the tackifier resins to the acrylic pressure sensitive adhesives, solvent-type acrylic resins have been found effective and put to practical use. On the other hand, the following methods have been known to improve adhesion of aqueous emulsion-type acrylic resins.

(1) A method wherein an aqueous emulsion-type acrylic resin is previously formed by emulsion polymerization and a tackifier resin emulsion is then added thereto (U.S. Pat. No. 4,645,711).

(2) A method wherein a solution obtained by dissolving a tackifier resin in an ethylenically unsaturated monomer or a dispersion obtained by emulsifying the above two materials with an emulsifying agent is added to a water containing a catalyst for polymerization and an emulsifying agent at a time or in divided portions for radical polymerization (British Patent No. 1,257,940 and Japanese Laid-open Patent Application No. 185,668/1983).

Nevertheless, in the method (1), as the particles of the aqueous emulsion-type acrylic resin are not uniformly mixed with the particles of the tackifier resin, the resulting adhesive is not improved in adhesion, making it impossible to obtain sufficient adhesion to olefins Besides, a film using such adhesive is poor in transparency, and the adhesive cannot be used in an adhesive sheet requiring transparency.

In the method (2), as drastic chain transfer to the tackifier resin occurs, the polymerization reaction of the ethylenically unsaturated monomer stops, so that a molecular weight is not increased and a stable adhesive cannot be produced, as well as sufficient cohesive strength and then sufficient adhesion to olefins are not obtainable.

It is therefore an object of this invention to provide an emulsion-type pressure sensitive acrylic adhesive which has well-balanced properties such as tackiness, adhesion and cohesive strength at high levels that could not be given by conventional aqueous emulsion-type acrylic adhesives, which is markedly high in tackiness and adhesion to polyolefins in particular within the wide temperature range from low to room temperature, and which gives extremely good transparency of the resulting film (pressure sensitive sheet).

The present inventors have made extensive studies to achieve the above object, and consequently found that an aqueous acrylic emulsion prepared by polymerizing an ethylenically unsaturated monomer containing a specific monomer in the presence of a tackifier resin emulsion and then emulsion polymerizing an ethylenically unsaturated monomer containing a specific alkyl (meth)acrylate can exhibit quite excellent properties as a pressure sensitive adhesive.

This invention is thus to provide a pressure sensitive adhesive composed of such an aqueous emulsion.

The aqueous emulsion-type pressure sensitive adhesive of this invention is characterized in that the aqueous emulsion is prepared by (i) a first step of emulsion polymerizing an ethylenically unsaturated monomer composed essentially of at least one type selected from styrene, alpha-methylstyrene, acrylonitrile, methyl methacrylate and vinyltoluene in the presence of an emulsion composed of at least one tackifier resin selected from a rosin ester, a petroleum resin and a terpene resin to form an aqueous emulsion containing particles of a two-layered structure having a core layer of the tackifier resin and a layer of a polymer (polymer $A_1$) derived from the ethylenically unsaturated monomer, and (ii) a second step of using the aqueous emulsion containing the particles of the two-layered structure as a seed and emulsion polymerizing an ethylenically unsaturated monomer composed essentially of at least one alkyl (meth)acrylate (an alkyl group has 4 or more carbon atoms) to form an aqueous emulsion containing particles of a multilayered structure having also a layer of a polymer (polymer $A_2$) derived from the ethylenically unsaturated monomer.

Examples of the tackifier resin used in the emulsion polymerization reaction in the first step (i) are shown below.

[1] Rosin esters

Rosins comprise, as a main component, a mixed melt of a monovalent carboxylic acid having an alkyl hydrophenanthrene nucleus represented by $C_{20}H_{30}O_2$ which is contained in turpentine or a tall oil; various resin acids represented b $C_{19}H_{29}COOH$; and small amounts of neutral ingredients such as diterpene alcohols, aldehydes, $C_{18}$ aliphatic acid esters and terpene hydrocarbons.

The rosin esters are esters composed of such rosins and polyhydric alcohols such as glycerol, pentaerythritol, etc. Preferable examples thereof are as follows.

(1) Hydrogenated rosin esters

Esters of hydrogenated rosins and polyhydric alcohols (2) Disproportionated rosin esters Esters of a resin acid mixture composed mainly of dihydroabietic acid and dehydroabietic acid formed by heat treating a rosin at a high temperature and a polyhydric alcohol such as glycerol or pentaerythritol.

[2] Petroleum resins

Petroleum resins obtained by copolymerizing unsaturated hydrocarbons resulting from heat decomposition of naphtha. Preferable examples thereof are as follows.

(1) Aliphatic petroleum resins

Resins obtained by heat decomposing a light naphtha, separating $C_2$–$C_4$ unsaturated hydrocarbons, and polymerizing the resulting unsaturated hydrocarbon mixture composed mainly of $C_5$ aliphatic fractions such as 2- methyl-2-butene, pentene, piperylene, isoprene, cyclopentene and cyclopentadiene.

(2) Aromatic petroleum resins

Resins obtained by heat decomposing a heavy naphtha, separating $C_6$–$C_8$ unsaturated hydrocarbons, and polymerizing the resulting unsaturated hydrocarbon mixture composed mainly of aromatic fractions such as $C_8$–$C_9$ alkyl benzenes, alpha-methylstyrene, beta-methylstyrene, vinyltoluene, indene and methylindene

[3] Terpene resins

Resins formed by polymerizing a turpentine oil containing a monocyclic terpene such as limonene or dipentene and/or a bicyclic terpene such as alpha-pinene, beta-pinene or camphene Preferable examples thereof are as follows.

(1) Unmodified terpene resins

Resins formed by polymerizing the turpentine oil containing the monocyclic terpene and/or the bicyclic terpene.

(2) Vinyl group-containing aromatic modified terpene resins

Resins formed by copolymerizing the turpentine oil containing the monocyclic terpene and/or the bicyclic terpene with aromatic hydrocarbons such as styrene, alpha-methylstyrene and vinyltoluene.

(3) Phenol-modified turpentine resins

Resins formed by copolymerizing the terpentine oil containing the monocyclic terpene and/or the bicyclic terpene with phenols such as a phenol, an alkylphenol, a halogenated phenol and a dihydric phenol.

Among these tackifier resins, the rosin esters are preferable, and the disproportionated rosin esters are especially preferable.

The tackifier resins are preferably those having a softening point of 65 to 130° C. measured by a ball and ring method because they smoothly advance the subsequent emulsion polymerization reaction and more improve heat resistance of the final pressure sensitive adhesive.

The emulsion composed of the tackifier resin may be either a commercial emulsion or an emulsion obtained by emulsion dispersing a commercial tackifier resin in the presence of an emulsifying agent.

The tackifier resin can be emulsified by an ordinary method. Examples thereof are a method wherein a tackifier resin is dissolved in an organic solvent such as toluene or xylene and the solution is forcibly emulsified in water with an emulsifying agent, followed by removing the solvent, and a method wherein a small amount of an organic solvent and a tackifier resin are forcibly emulsified in an aqueous solution of an emulsifying agent at high temperatures under increased pressure with stirring, followed by removing the solvent. The tackifier resin emulsion used in this invention is desirously one wherein the residual solvent is not more than 1% by weight, preferably not more than 0.5% by weight for smoothly advancing the subsequent emulsion polymerization.

An average particle diameter of the tackifier resin emulsion is usually not more than 0.5 micrometer. It is preferably 0.1 to 0.5 micrometer, most preferably 0.2 to 0.35 micrometer because stability of the aqueous emulsion containing the particles of the multilayered structure and transparency of the final pressure sensitive adhesive film (pressure sensitive sheet) become thereby excellent.

The ethylenically unsaturated monomer used to form the polymer $A_1$ in the reaction of the first step (i) is composed essentially of at least one type selected from styrene, alpha-methylstyrene, acrylonitrile, methyl methacrylate and vinyltoluene, optionally containing the other ethylenically unsaturated monomer copolymerizable therewith. The polymer $A_1$ containing styrene is preferable.

In this invention, the layer of the polymer $A_1$ made of the above ethylenically unsaturated monomer is formed on the tackifier resin as the core layer in order that direct occurrence of chain transfer to the tackifier resin is prevented in polymerizing the ethylenically unsaturated monomer composed essentially of an alkyl (meth)acrylate having 4 or more carbon atoms in the second step to provide a given molecular weight and compatibility is imparted to the tackifier resin and the polymer (polymer $A_2$) of the ethylenically unsaturated monomer composed essentially of the specific alkyl (meth)acrylate, both being substantially poor in compatibility in particulate form. By thus coating the tackifier resin with the polymer A, there can be improved properties of the final pressure sensitive adhesive, such as tackiness, adhesion and cohesive strength, and transparency of the film (pressure sensitive adhesive sheet).

With a view to alleviating chain transfer to the tackifier resin, obtaining a given molecular weight and imparting good compatibility between the tackifier resin and the polymer $A_2$, a proportion that a unit of an essential monomer selected from styrene, alpha-methylstyrene, acrylonitrile, methyl methacrylate and vinyltoluene occupies in the polymer $A_1$ is 20 to 100% by weight, preferably 50 to 100% by weight.

Examples of the other monomer being optionally copolymerized with the essential monomer to form the polymer $A_1$ are the alkyl (meth)acrylate having 4 or more carbon atoms, used in the reaction of the second step (ii) to be later described, and other ethylenically unsaturated monomers.

Typical examples of the alkyl (meth)acrylate having 4 or more carbon atoms as an essential component to form the polymer $A_2$ in the reaction of the second step (ii) are butyl (meth)acrylate, amyl (meth)acrylate, hexyl (meth)acrylate, 2-ethylhexyl (meth)acrylate, octyl (meth)acrylate and nonyl (meth)acrylate Of these, the alkyl acrylates having 4 to 8 carbon atoms are preferable. These alkyl (meth)acrylates having 4 or more carbon atoms are indispensable components to impart adhesion to the final pressure sensitive adhesive.

Examples of the other monomer being optionally copolymerized with the alkyl (meth)acrylate as the essential monomer to form the polymer $A_2$ are vinyl acetate, vinyl propionate, versatic acid vinyl ester, styrene, acrylonitrile, ethylene, propylene, isoprene, methyl (meth)acrylate, ethyl (meth)acrylate, propyl acrylate, beta-hydroxy(meth)acrylate, glycidyl (meth)acrylate, unsaturated carboxylic acids such as (meth)acrylic acid, maleic acid and itaconic acid, and vinylsilanes such as vinyltriethoxysilane.

In order to afford the pressure sensitive adhesive having the aforesaid profitable properties, the types and amounts of the polymers $A_1$ and $A_2$ have to be selected such that the average glass transition temperature (Tg) of the polymers $A_1$ and $A_2$ becomes a suitable value Said average glass transition temperature (Tg) may be usually −35° C. to −70° C., preferably −25° C. to −60° C. in imparting the profitable properties to the final pressure sensitive adhesive Said average glass transition temperature (Tg) is not actually measured but calculated according to the following equation.

$$Tg = \frac{Tg(A_1) \times Tg(A_2)}{Tg(A_2) \times a + Tg(A_1) \times b}$$

wherein $Tg(A_1)$ is a value of a glass transition temperature of a polymer $A_1$ calculated from glass transition temperatures and proportions of homopolymers of monomers constituting the polymer $A_1$, $Tg(A_2)$ is a value of a glass transition temperature of a polymer $A_2$ calculated from glass transition temperatures and proportions of homopolymers of monomers constituting the polymer $A_2$, a is a proportion that monomers constituting the polymer $A_1$ occupy in the total of the monomers constituting the polymers $A_1$ a $A_2$, and b is a proportion that monomers constituting the polymer $A_2$ occupy in the total of the monomers constituting the polymers $A_1$ and $A_2$.

The Tg value can be adjusted by, for example, using the above alkyl (meth)acrylate having 4 or more carbon atoms as a main component and optionally combining it with the other ethylenically unsaturated monomer.

In the aqueous emulsion-type pressure sensitive adhesive containing the particles of the multilayered structure which is prepared by the first step and second step reactions, the particles of the multilayered structure comprise usually 3 to 30% by weight, preferably 5 to 20% by weight of the tackifier resin, usually 3 to 20% by weight, preferably 3 to 20% by weight of the polymer $A_1$, and usually 94 to 50% by weight, preferably 92 to 60% by weight of the polymer $A_2$.

In this invention, a known emulsion polymerization technology may be employed to prepare the aqueous emulsion-type pressure sensitive adhesive containing the particles of the multilayered structure by the first step and second step reactions, and any process for preparing same will do. For instance, in the first step, the tackifier resin is dispersed in water to prepare an emulsion, the ethylenically unsaturated monomer to form the polymer $A_1$ is then added thereto, and polymerization is performed at a polymerization temperature of 30 to 90° C. in the presence of a known catalyst for radical formation; and then in the second step, the ethylenically unsaturated monomer to form the polymer $A_2$ is added to the emulsion, and polymerization is performed at a polymerization temperature of 30 to 90° C. in the presence of a known catalyst for radical formation to afford the intended aqueous emulsion-type pressure sensitive adhesive.

In the emulsion polymerization reactions of the first and second steps, there is no need to freshly use an emulsifying agent. However, ordinary anionic emulsifying agents, nonionic emulsifying agents or emulsion dispersing agents such as water-soluble polymers or oligomers may optionally be used. Known molecular weight modifiers are also usable.

The aqueous emulsion containing the particles of the multilayered structure in this invention can have a solids content of up to about 70% by weight. In the aspects of economy and stability, the solids content is preferably 45 to 65% by weight.

The thus obtained aqueous emulsion-type pressure sensitive adhesive of this invention can be put to practical use as such by coating it onto a substrate such as a sheet, cloth, plastics, film and metal. To this aqueous emulsion as a main component may be added suitable amounts of known thickening agents, wetting agents, pigments, plasticizers and tackifiers. In any case, the aqueous emulsion-type pressure sensitive adhesive of this invention is excellent in tackiness, adhesion and cohesive strength and exhibits markedly improved tackiness and adhesion to olefins in particular.

The following Examples and Comparative Examples illustrate this invention more specifically. However, this invention is not limited to these examples. Parts and percentages in said examples are all by weight.

Commercial tackifier resin emulsions (A-1 to A-3) shown in Table 1 and emulsions (B-1 to B-6) obtained by dispersing tackifier resins shown in Table 2 in water by a method described in Referential Example below were used as tackifier resin emulsions.

REFERENTIAL EXAMPLE

Each of various tackifier resins shown in Table 2 was dissolved in toluene (solids content 70%), and sodium lauryl sulfate and polyoxyethylenenonylphenyl ether were then added to the solution With stirring, water was added to emulsify the mixture. The resulting mixture was further forcibly stirred with a homomixer and micronized. Subsequently, the solvent was removed under reduced pressure. There resulted a tackifier resin emulsion having properties shown in Table 2.

EXAMPLES 1 TO 13

A reaction vessel fitted with a stirrer, condenser, thermometer and dropping funnel was charged with 47 parts of deionized water and each of various tackifier resin emulsions having properties shown in Tables 1 and 2 in amounts shown in Table 3. The temperature of the inside was kept at 80° C. and a nitrogen gas was fed to the reaction vessel. Monomers to form a polymer $A_1$, shown in Table 3, were then added in given amounts shown in Table 3, and the mixture was stirred for 30 minutes.

Thereafter, a catalyst solution of 0.2 part of ammonium persulfate in 3 parts of deionized water was added. The above temperature was maintained for 1 hour, and then the reaction was run.

In order to form a polymer $A_2$, a mixture of monomers in given amounts shown in Table 2, and a mixture of 0.3 part of ammonium persulfate and 5 parts of deionized water were separately poured each for 3 hours. Further, the mixture was maintained at the same temperature for 1 hour and then cooled, followed by adjusting pH to 6 to 7 with 25% aqueous ammonia.

The properties of the resulting aqueous emulsion having the multilayered particle structure are shown in Table 4.

COMPARATIVE EXAMPLES 1 TO 4

Each of tackifier resins in given amounts shown in Table 3 was dissolved in a mixture of monomers in given amounts shown in Table 3. Two parts of polyoxyethylenenonylphenyl ether and 50 parts of deionized water were added to the solution by stirring to form an emulsified substance.

Next, 50 parts of deionized water was charged in the same reaction vessel as used in Examples 1 to 13, and 2 parts of polyoxyethylenenonylphenol ether was dissolved therein. While the temperature of the inside was kept at 80° C., a nitrogen gas was fed. With stirring, part (10%) of the emulsified substance and a catalyst solution of 0.2 part of ammonium persulfate in 5 parts of deionized water were added and the reaction was conducted for 30 minutes.

Subsequently, the remainder (90%) of the emulsified substance and a catalyst solution of 0.3 part of ammonium persulfate in 8 parts of deionized water were poured over a period of 4 hours. The mixture was maintained at the same temperature for 1 hour and then cooled, followed by adjusting pH to 6 to 7 with a 25% aqueous ammonia.

The properties of the thus obtained aqueous emulsion are shown in Table 4. As the emulsions in Comparative Examples 1 and 3 were destroyed, properties of the pressure sensitive adhesive sheets were not measured.

COMPARATIVE EXAMPLES 5 TO 8

A mixture of monomers in given amounts shown in Table 3, 48 parts of deionized water and 1 part of a sodium alkylbenzenesulfonate were charged in the same reaction vessel as used in Examples 1 to 13. The temperature of the inside was kept at 80° C. and a nitrogen gas was fed to the reaction vessel. A catalyst solution of 0.3 part of ammonium persulfate in 8 parts of deionized water was then poured over a period of 4 hours. The mixture was further maintained at the same temperature for 1 hour and then cooled, followed by adjusting pH to 6 to 7 with a 25% aqueous ammonia. Subsequently, the nonvolatile content was adjusted to 59.5 to 60% with deionized water.

To the thus obtained emulsion was added a tackifier resin emulsion in a given amount shown in Table 3 to prepare an emulsion mixture.

The properties of the resulting emulsion mixture are shown in Table 4.

TEST EXAMPLE

Each of the emulsions obtained in Examples 1 to 13 and Comparative Examples 1 to 8 was coated on a polyester film 25 micrometers in thickness by an applicator such that the evaporation residue after drying became 30 g/m², and the coated film was dried to form a pressure sensitive adhesive sheet.

The properties such as tackiness, adhesion, holding power, etc. were measured for the resulting pressure sensitive adhesive sheets. The results are shown in Table 4. By the way, delamination in the tests for peeling strength (23° C. & 5° C.) is interfacial delamination unless otherwise indicated.

Methods of measuring the properties are mentioned below.

(1) Average particle diameter of an emulsion:
Measured by JEM-30C SUPERSCOPE, an electron microscope manufactured by JEOL, Ltd.

(2) Solvent content:
Measured by gas chromatography.

(3) Average glass transition temperature (Tg):
The glass transition temperatures of the polymers $A_1$ and $A_2$ were first calculated from glass transition temperatures of homopolymers of monomers constituting the polymers $A_1$ and $A_2$. From the above glass transition temperatures of the polymers $A_1$ and $A_2$, an average glass transition temperature was calculated (6) Tackiness:
In accordance with a J. Dow method, a rolling ball tack was measured at 23° C. and 65% RH.

(7) Holding power:
The sample was adhered to a stainless steel sheet in a 20×20 mm adhering area and pressed through one reciprocation by a rubber roller of 2 kg. The pressed sheet was maintained in a constant temperature drier held at a given temperature for 30 minutes. Subsequently, a load of 1 kg was exerted on the lower end of the sample, and a time that lapsed until the sample dropped was measured (40° C. & 80° C.).

(8) Film transparency:
Transparency of the formed pressure sensitive adhesive sheet was measured by visual observation.

(Evaluation)

O . . . transparent
Δ . . . slightly opaque
X . . . remarkably opaque
according to the aforesaid equation.

The glass transition temperatures (Tg) of the homopolymers of the monomers used in the calculation are as follows.

|  | Tg (°C.) |
|---|---|
| Polystyrene | 100 |
| Polyacrylonitrile | 96 |
| Polymethyl methacrylate | 105 |
| Poly-m-vinyltoluene | 96 |
| Poly-alpha-methylstyrene | 192 |
| Poly-2-ethylhexyl acrylate | −70 |
| Polybutyl acrylate | −56 |
| Polyethyl acrylate | −24 |
| Polyvinyl acetate | 28 |
| Polyglycidyl methacrylate | 46 |
| Polymethacrylic acid | 144 |
| Polyacrylic acid | 106 |
| 2-Hydroxyethyl methacrylate | 25 |

(4) Peeling strength (23° C.):
In accordance with JIS Z-1522, the sample was adhered to a stainless steel (SUS), polyethylene (PE) or polypropylene (PF) and peeled off at a speed of 300 mm/min in a direction of 180°, and the strength at that time was measured (23° C.).

(5) Peeling strength (5° C.):
The test for adhesion in (4) was run at 5° C.

TABLE 1

| Emulsion | A-1 | A-2 | A-3 |
|---|---|---|---|
| Tackifier resin | SUPER-ESTER E-710 *1 | SUPER-ESTER E-730 *2 | HARI-ESTER AS-90E *3 |
| Type of tackifier resin | Glycerol ester of disproportionated rosin | Pentaerythritol ester of disproportionated rosin | Glycerol ester of disproportionated rosin |
| Softening point (°C.) | 75 | 125 | 90 |
| Solids content (%) | 50 | 50 | 50 |
| Average particle diameter (micrometer) | 0.26 | 0.25 | 0.31 |
| Solvent content (%) | 0.1≧ | 0.1≧ | 0.1≧ |

*1 Emulsion using glycerol ester A-75 of disproportionated rosin (softening point 75° C.) made by Arakawa Kagaku Kogyo K. K.
*2 Emulsion using pentaerythritol ester A-125 of disproportionated rosin (softening point 125° C.) made by Arakawa Kagaku Kogyo K. K.
*3 Emulsion using glycerol ester AS-90 (softening point 90° C.) of disproportionated rosin made by Harima Kasei Kogyo K. K.

TABLE 2

| Emulsion | B-1 | B-2 | B-3 | B-4 | B-5 | B-6 |
|---|---|---|---|---|---|---|
| Tackifier resin | ESTER-GUM HR *4 | YS-RESIN Px #800 *5 | YS-RESIN TO-85 *6 | YS-POLY-STAR #2115 *7 | ESCOREZ 1102 *8 | PETROSIN #120 *9 |
| Type of tackifier resin | Pentaerythritol ester of hydrogenated rosin | Unmodified terpene resin | Styrene-modified terpene resin | Phenol-modified terpene resin | $C_5$ aliphatic petroleum resin | $C_9$ aromatic petroleum resin |
| Softening point (°C.) | 85 | 80 | 85 | 115 | 100 | 120 |
| Solids content (%) | 50 | 50 | 50 | 50 | 50 | 50 |
| Average particle diameter (micrometer) | 0.25 | 0.28 | 0.31 | 0.28 | 0.28 | 0.27 |
| Solvent content (%) | 0.1≧ | 0.1≧ | 0.1≧ | 0.1≧ | 0.1≧ | 0.1≧ |

*4 Product made by Arakawa Kagaku Kogyo K. K.
*5 Product made by Yasuhara Yushi Kogyo K. K.
*6 Product made by Yasuhara Yushi Kogyo K. K.
*7 Product made by Yasuhara Yushi Kogyo K. K.
*8 Product made by Exxon Research and Engineering Co. Ltd.
*9 Product made by Mitsui Petrochemical Industries, Ltd.

TABLE 3

| | | Example 1 | 2 | 3 | 4 | 5 | 6 | 7 | 8 | 9 | 10 | 11 | 12 | 13 |
|---|---|---|---|---|---|---|---|---|---|---|---|---|---|---|
| Tackifier resin emulsion | A-1 | | 20 | | | | | | | | | | | |
| | A-2 | 20 | | | 20 | 10 | 36 | | | | | | | |
| | A-3 | | | 20 | | | | | | | | | | |
| | B-1 | | | | | | | | 16 | | | | | |
| | B-2 | | | | | | | | | 14 | | | | |
| | B-3 | | | | | | | | | | 36 | | | |
| | B-4 | | | | | | | | | | 20 | | | |
| | B-5 | | | | | | | | | | | 20 | | |
| | B-6 | | | | | | | | | | | | 20 | 50 |
| Composition of polymer $A_1$ | Styrene | 5 | 10 | | | 4.5 | 5 | 3 | 5 | 8 | 12 | 15 | 15 | 10 |
| | Methyl methacrylate | | 5 | 5 | | | 2 | | | 5 | | | | |
| | Acrylonitrile | | | 5 | | | | | 2 | | | | | |
| | α-Methylstyrene | | | | | | | 2 | | | | | | |
| | Vinyltoluene | | | | 5 | | | | 2 | | | | | |
| | Butyl acrylate | | | | 5 | | 2 | | | 4 | 3 | | | 5 |
| | Ethyl acrylate | | | | | | | | | | | | | |
| | Glycidyl methacrylate | | | | 0.5 | | | | | | | | | |
| Composition of polymer $A_2$ | 2-Ethylhexyl acrylate | 45 | 74 | 45 | 45 | | 71 | 75 | 75 | 63 | 74 | 74 | 74 | 40 |
| | Butyl acrylate | 39 | | 34 | 25 | 70 | | | | | | | | 18 |
| | Methyl methacrylate | | | | 9 | 19 | | | | | | | | |
| | Vinyl acetate | | | | | | | | 11 | | | | | |
| | Methacrylic acid | | 1 | 1 | 1 | | 2 | | | 1 | | 1 | 1 | 2 |
| | Acrylic acid | 1 | | | | 1 | | 1 | 1 | | 1 | | | |
| | Methyl acrylate | | | | | | | | 10 | | | | | |
| | 2-Hydroxyethyl methacrylate | | | | | | | | | 1 | | | | |

| | | Comparative Example 1 | 2 | 3 | 4 | 5 | 6 | 7 | 8 |
|---|---|---|---|---|---|---|---|---|---|
| Tackifier resin & emulsion | A-2 | | | | | 20 | 10 | | |
| | SUPER-ESTER A-125 *10 | 10 | 5 | | | | | | |
| | B-3 | | | | | | | 36 | |
| | YS-RESIN TO-85 | | | 18 | | | | | |
| | B-5 | | | | | | | | 20 |
| | ESCOREZ 1102 | | | | 10 | | | | |
| Monomer | Styrene | 5 | 4.5 | 8 | 15 | 5 | 4.5 | 8 | 15 |
| | Acrylonitrile | | | 5 | | | | 5 | |
| | Diglycidyl methacrylate | | 0.5 | | | | 0.5 | | |
| | Butyl acrylate | 39 | 70 | 4 | | 39 | 70 | 4 | |
| | 2-Ethylhexyl acrylate | 45 | | 63 | 74 | 45 | | 63 | 74 |
| | Acrylic acid | 1 | | | | 1 | | | |
| | Methyl methacrylate | | 19 | | | | 19 | | |
| | Methacrylic acid | | 1 | 1 | 1 | | 1 | 1 | 1 |
| | β-Hydroxyethyl methacrylate | | | | | | | 1 | |
| | State of emulsion | A large amount of an agglomerate was formed to destroy an emulsion. | An emulsion containing a small amount of an agglomerate was formed. | A large amount of an agglomerate was formed to destroy an emulsion. | An agglomerate was formed. | | | | |

*10 Pentaerythritol ester of disproportionated rosin (softening point 125° C.) made by Arakawa Kagaku Kogyo K. K.

TABLE 4

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| State of emulsion | Solids content (%) | 60.1 | 60.2 | 60.0 | 60.0 | 59.8 | 60.3 | 59.8 | 59.5 | 60.5 | 60.3 | 60.3 |
| | pH | 6.7 | 6.2 | 6.3 | 6.3 | 6.5 | 6.5 | 6.9 | 6.2 | 6.6 | 6.9 | 6.4 |
| | Viscosity (CPS, 25° C.) | 180 | 230 | 180 | 250 | 150 | 200 | 280 | 150 | 190 | 220 | 210 |
| | Tg ($A_1 + A_2$) °C. | −58 | −51 | −51 | −47 | −32 | −58 | −53 | −55 | −51 | −55 | −52 |
| Properties of pressure sensitive adhesive sheet | Peeling strength (23° C.) (g/10 mm) SUS | 780 | 750 | 750 | 840 | 780 | 750 | 700 | 710 | 750 | 780 | 680 |
| | PE | 420 | 400 | 400 | 470 | 360 | 410 | 360 | 330 | 380 | 350 | 360 |
| | PP | 590 | 560 | 550 | 630 | 490 | 600 | 450 | 430 | 500 | 450 | 490 |
| | Peeling strength (5° C.) (g/10 mm) SUS | 960 | 950 | 940 | 830 | 1000 | 900 | 800 | 800 | 860 | 880 | 830 |
| | PE | 490 | 500 | 440 | 450 | 400 | 450 | 380 | 370 | 400 | 410 | 460 |
| | PP | 720 | 680 | 650 | 540 | 620 | 600 | 550 | 550 | 600 | 610 | 550 |
| | Tackiness | 10 | 11 | 10 | 9 | 8 | 9 | 10 | 10 | 9 | 10 | 11 |
| | Holding power (min) 40° C. | 1000< | 1000< | 1000< | 1000< | 1000< | 1000< | 1000< | 1000< | 1000< | 1000< | 1000< |
| | 80° C. | 400 | 400 | 1000< | 1000< | 1000< | 400 | 550 | 45 | 300 | 330 | 400 |
| | Film transparency | | | | | | | | | | | |

| | | Example 12 | Example 13 | Comparative Example 2 | Comparative Example 4 | Comparative Example 5 | Comparative Example 6 | Comparative Example 7 | Comparative Example 8 |
|---|---|---|---|---|---|---|---|---|---|
| State of emulsion | Solids content (%) | 60.4 | 60.3 | 46.6 | 45.0 | 58.3 | 57.8 | 57.6 | 58.3 |
| | pH | 6.5 | 6.9 | 6.7 | 6.8 | 6.7 | 6.6 | 6.6 | 6.7 |
| | Viscosity (CPS, 25° C.) | 205 | 220 | 160 | 150 | 180 | 200 | 200 | 150 |
| | Tg ($A_1 + A_2$) °C. | −51 | −46 | −32 | −52 | −58 | −32 | −51 | −52 |
| Properties of pressure sensitive adhesive sheet | Peeling strength (23° C.) (g/10 mm) SUS | 690 | 650 | 700* | 660* | 510 | 500 | 410 | 410 |
| | PE | 390 | 260 | 360* | 400* | 160 | 180 | 110 | 130 |
| | PP | 510 | 380 | 480* | 460* | 220 | 200 | 160 | 180 |
| | Peeling strength (25° C.) (g/10 mm) SUS | 950 | 680 | 650 | 700 | 600 | 700 | 450 | 480 |
| | PE | 450 | 300 | 200 | 250 | 180 | 60 | 150 | 130 |
| | PP | 580 | 390 | 230 | 280 | 250 | 100 | 180 | 200 |
| | Tackiness | 9 | 8 | 8 | 10 | 9 | 5 | 9 | 8 |
| | Holding power (min) 40° C. | 1000< | 1000< | 45 | 20 | 300 | 1000< | 310 | 280 |
| | 80° C. | 1000< | 200 | 13 | 5 | 15 | 400 | 10 | 20 |
| | Film transparency | | | | −Δ | | | X | X |

*Delamination was caused by destroying the emulsion on agglomeration.

What is claimed is:

1. An aqueous emulsion pressure sensitive adhesive prepared by the process comprising:
   (i) a first step of emulsion polymerizing a first ethylenically unsaturated monomer comprising at least one monomer selected from the group consisting of styrene, alpha-methylstyrene, acrylonitrile, methyl methacrylate and vinyltoluene in the presence of an emulsion comprising at least one tackifier resin selected from the group consisting of a rosin ester, a petroleum resin and a terpene resin to form an aqueous emulsion containing particles of a two layered structure having a core layer of said at least one tackifier resin and a layer of a polymer $A_1$ formed from said first ethylenically unsaturated monomer, and
   (ii) a second step of using said aqueous emulsion containing said particles of said two-layered structure as a seed and emulsion polymerizing a second ethylenically unsaturated monomer comprising at least one alkyl (meth)acrylate, said alkyl group having 4 or more carbon atoms, to form an aqueous emulsion containing particles of a multilayered structure having a layer of a polymer $A_2$ formed from said second ethylenically unsaturated monomer.

2. The aqueous emulsion pressure sensitive adhesive of claim 1, wherein said at least one monomer selected from the group consisting of styrene, alpha-methylstyrene, acrylonitrile, methyl methacrylate and vinyltoluene comprises 20 to 100% by weight of said polymer $A_1$.

3. The aqueous emulsion pressure sensitive adhesive of claim 1 or 2, wherein said emulsion comprising said at least one tackifier resin has an average particle diameter of not more than 0.5 micrometer.

4. The aqueous emulsion pressure sensitive adhesive of claim 1 or 2, wherein said polymers $A_1$ and $A_2$ have an average glass transition temperature, Tg, of the polymers $A_1$ and $A_2$ in the range of from −25° C. to −60° C.

5. The aqueous emulsion pressure sensitive adhesive of claim 1 or 2 wherein said particles of said multilayered structure comprise 3 to 30% by weight of said tackifier resin, 3 to 20% by weight of said polymer $A_1$ and 94 to 50% by weight of said polymer $A_2$.

6. The aqueous emulsion pressure sensitive adhesive of claim 1 or 2, wherein said tackifier resin is a rosin ester having a softening point of from 65° C. to 130° C.

7. The aqueous emulsion pressure sensitive adhesive of claim 1 or 2, wherein said tackifier resin is a disproportionated rosin ester having a softening point of from 65° C. to 130° C.

8. The aqueous emulsion pressure sensitive adhesive of claim 3, wherein said polymers $A_1$ and $A_2$ have an average glass transition temperature, Tg, of the polymers $A_1$ and $A_2$ in the range of from $-25°$ C. to $-60°$ C.

9. The aqueous emulsion pressure sensitive adhesive of claim 3, wherein said tackifier resin is a rosin ester having a softening point of from 65° C. to 130° C.

10. The aqueous emulsion pressure sensitive adhesive of claim 4, wherein said tackifier resin is a rosin ester having a softening point of from 65° C. to 130° C.

11. The aqueous emulsion pressure sensitive adhesive of claim 5, wherein said tackifier resin is a rosin ester having a softening point of from 65° C. to 130° C.

12. The aqueous emulsion pressure sensitive adhesive of claim 3, wherein said tackifier resin is a disproportionated rosin ester having a softening point of from 65° C. to 130° C.

13. The aqueous emulsion pressure sensitive adhesive of claim 4, wherein said tackifier resin is a disproportionated rosin ester having a softening point of from 65° C. to 130° C.

14. The aqueous emulsion pressure sensitive adhesive of claim 5, wherein said tackifier resin is a disproportionated rosin ester having a softening point of from 65° C. to 130° C.

15. The aqueous emulsion pressure sensitive adhesive of claim 2, wherein said at least one monomer selected from the group consisting of styrene, alpha-methylstyrene, acrylonitrile, methyl methacrylate and vinyltoluene comprises 50 to 100% by weight of said polymer $A_1$.

16. The aqueous emulsion pressure sensitive adhesive of claim 1, wherein said second ethylenically unsaturated monomer comprises at least one alkyl (meth)acrylate, said alkyl group having 4 to 8 carbon atoms.

17. The aqueous emulsion pressure sensitive adhesive of claim 1, wherein said second ethylenically unsaturated monomer comprises at least one alkyl (meth)acrylate selected from the group consisting of butyl (meth)acrylate, amyl (meth)acrylate, hexyl (meth)acrylate, 2-ethylhexyl (meth)acrylate, octyl (meth)acrylate and nonyl (meth)acrylate.

18. The aqueous emulsion pressure sensitive adhesive of claim 1, wherein said aqueous emulsion containing particles of a multilayered structure has a solids content of up to about 70% by weight.

19. The aqueous emulsion pressure sensitive adhesive of claim 18, wherein said solids content is 45 to 65% by weight.

* * * * *